(12) United States Patent
Karlsson et al.

(10) Patent No.: US 11,090,594 B2
(45) Date of Patent: Aug. 17, 2021

(54) FILTER ELEMENT COMPRISING TWO OFFSET OUTLETS IN COMMUNICATION WITH FILTER INNER SPACE, AS WELL AS CORRESPONDING HOUSING

(71) Applicant: VOLVO TRUCK CORPORATION, Gothenburg (SE)

(72) Inventors: Sebastian Karlsson, Gothenburg (SE); Fredrik Bramer, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 191 days.

(21) Appl. No.: 16/063,174

(22) PCT Filed: Dec. 16, 2016

(86) PCT No.: PCT/EP2016/081350
§ 371 (c)(1),
(2) Date: Jun. 15, 2018

(87) PCT Pub. No.: WO2017/103048
PCT Pub. Date: Jun. 22, 2017

(65) Prior Publication Data
US 2018/0369732 A1     Dec. 27, 2018

Related U.S. Application Data

(63) Continuation-in-part of application No. PCT/EP2015/080534, filed on Dec. 18, 2015.

(51) Int. Cl.
| | | |
|---|---|---|
| *B01D 46/00* | (2006.01) | |
| *B01D 46/24* | (2006.01) | |
| *B01D 46/42* | (2006.01) | |

(52) U.S. Cl.
CPC ..... *B01D 46/0004* (2013.01); *B01D 46/0047* (2013.01); *B01D 46/2414* (2013.01); *B01D 46/4236* (2013.01); *B01D 2275/208* (2013.01)

(58) Field of Classification Search
CPC ............ B01D 46/0004; B01D 46/2414; B01D 46/0047; B01D 46/4236; B01D 2275/208
See application file for complete search history.

(56) References Cited

U.S. PATENT DOCUMENTS

| 4,964,984 A | 10/1990 | Reeder et al. |
|---|---|---|
| 5,190,651 A | 3/1993 | Spencer et al. |

(Continued)

FOREIGN PATENT DOCUMENTS

| CN | 102481497 A | 5/2012 |
|---|---|---|
| CN | 103547352 A | 1/2014 |

(Continued)

OTHER PUBLICATIONS

International Sear Report (dated Apr. 21, 2017) for corresponding International App. PCT/EP2016/081350.

(Continued)

*Primary Examiner* — Robert Clemente
(74) *Attorney, Agent, or Firm* — Withrow & Terranova PLLC

(57) ABSTRACT

A filter element is provided having a tubular shape defining an inner space, a first outlet in communication with the inner space and a second outlet in communication with the inner space, wherein the second outlet has an offset position in relation to the first outlet in a transversal direction of the filter element. Also provided is a filter housing having an inner housing space adapted to receive a tubular filter element, the filter housing having an inlet, a first outlet located in a first end of the filter housing, and a second outlet located in a second end of the filter housing, wherein the second end is located opposite to the first end in relation to the inner housing space.

12 Claims, 7 Drawing Sheets

(56) References Cited

U.S. PATENT DOCUMENTS

| | | | |
|---|---|---|---|
| 2002/0162309 A1* | 11/2002 | Schmitz | B01D 46/0001 55/423 |
| 2003/0159587 A1 | 8/2003 | Letourneau et al. | |
| 2005/0061292 A1 | 3/2005 | Prellwitz et al. | |
| 2007/0079813 A1 | 4/2007 | Kramer et al. | |
| 2011/0203240 A1 | 8/2011 | Langner | |
| 2013/0042587 A1 | 2/2013 | Traub | |
| 2014/0223868 A1 | 8/2014 | Kaufmann et al. | |
| 2014/0284266 A1 | 9/2014 | Kamp et al. | |
| 2015/0033684 A1 | 2/2015 | Pettersson | |

FOREIGN PATENT DOCUMENTS

| | | |
|---|---|---|
| DE | 202008014211 U1 | 3/2010 |
| DE | 102010009268 A1 | 8/2011 |
| DE | 102011077712 A1 | 12/2012 |
| DE | 102012112653 A1 | 6/2014 |
| GB | 2450735 A | 1/2009 |
| WO | 2013063497 A2 | 5/2013 |
| WO | 2014202359 A1 | 12/2014 |
| WO | 2015075055 A1 | 5/2015 |

OTHER PUBLICATIONS

First Office Action for Chinese Patent Application No. 201680074028.7, dated May 7, 2020, 15 pages.
Extended European Search Report for European Patent Application No. 20152363.6, dated May 12, 2020, 9 pages.

* cited by examiner

FILTER ELEMENT COMPRISING TWO OFFSET OUTLETS IN COMMUNICATION WITH FILTER INNER SPACE, AS WELL AS CORRESPONDING HOUSING

BACKGROUND AND SUMMARY

The present disclosure relates to a filter element having a tubular shape defining an inner space, a first outlet in communication with the inner space and a second outlet in communication with the inner space. The filter element may alternatively be called filter cartridge, filter module or filter insert. The disclosure further comprises a filter housing having an inner housing space adapted to receive the tubular filter element. The filter housing has an inlet, a first outlet located in a first end of the filter housing, and a second outlet located in a second end of the filter housing. An internal combustion engine system and a vehicle are also disclosed.

Filters are used in many places in a vehicle. It is i.a. well known to provide an internal combustion engine with an air filter for cleaning intake air for use in the internal combustion engine. There may also be other users of clean air in a vehicle which needs clean air, components such as a compressor for a brake system. Other filter types include for example oil filters. An air filter in a vehicle is replaced on a regular basis to keep the performance of the filter and of the devices receiving the filtered air at a desired level. The same is true also for other filter types filtering other fluids. The filter can be designed in many different shapes and configurations.

To avoid noise in the air intake system of a vehicle the users of clean air are often equipped with devices that reduce noise e.g. resonators. These need space in the already limited space of the vehicle. It is also difficult to find space to put separate air filters for all components needing clean air in the vehicle.

A manner in which these functions have been combined into one installation is disclosed in US 2005/0061292 A1. This document discloses an intake air filter for a combustion engine, especially in a motor vehicle. The filter comprises a filter housing having a raw air inlet, a pure air outlet, and an annular filter which is arranged in the filter housing and through which air can flow in a radial manner from its outside towards its inside. The filter comprises a first end disk on the axial end thereof, wherein the disk comprises an opening by which means the pure air outlet communicates with the inside of the annular filter. The aim of the device is to reduce the influence of a secondary air induction on the fresh air supply of the internal combustion engine. To this end, the filter housing comprises a secondary air outlet, on the pure air side, and the annular filter comprises a second end disk on an axial end opposing the first end disk. The second end disk comprises one smaller opening by which the secondary air outlet communicates with the inside of the annular filter.

The filter and the filter housing are however rather complex and bulky, leading to extended assembly time and inefficient use of space. The bulkiness may also have a negative effect on noise optimized tuning of the intake system.

According to another filter element, DE 10 2012 112653 relates to an air filter having a filter insert that is arranged in an air filter housing, and is provided with two air ports at both ends. Further, WO 2015/075055 relates to a filter insert for a filter device. The filter insert has a filter element arranged on a longitudinal axis. Also, US 2013/042587 relates to a filter device comprising an air filter for a fresh air system of a motor vehicle.

It is desirable to at least to some extent alleviate the shortcomings discussed above in relation to known filters, and to improve a filter and housing, especially for noise and space related issues of a filter inside an air filter housing.

According to a first aspect of the present disclosure, a filter element is disclosed having a tubular shape defining an inner space. It also has a first outlet in communication with the inner space and a second outlet in communication with the inner space, wherein the second outlet has an offset position in relation to the first outlet in a transversal direction of the filter element.

A filter element of this kind proves advantageous in that it may provide an improved acoustic response of the total filter system. One feature to reduce noise is a sudden increase in cross section in the air duct. Also, increasing the distance of the offset position for the second outlet in relation to the first outlet provides for a reduced noise. Furthermore, increasing the distance between the inlet and the second outlet provides for an improved acoustic response. The filter element is also simple and compact in its design, whereby its need of space in its end using facility, such as a vehicle, is reduced. According to one example, the transversal direction of the filter element is perpendicular to an axial direction, or centre axis, of the filter element.

According to an embodiment the first outlet has a first centre axis and the second outlet has a second centre axis, wherein the offset position of the second outlet in relation to the first outlet is defined by an offset position between the second centre axis in relation to the first centre axis. This improves the acoustic response when using the filter element. According to one example, the first outlet is arranged in such a way relative to the second outlet that the first centre axis and the second centre axis are in parallel with each other. According to a further example, the first outlet is arranged in such a way relative to the filter insert that the first centre axis is in parallel with the axial direction, or centre axis, of the filter element. According to a still further example, which is an alternative or complement to the last mentioned example, the second outlet is arranged in such a way relative to the filter insert that the second centre axis is in parallel with the axial direction, or centre axis, of the filter element.

According to an embodiment the offset position involves a distance, and preferably is a distance, in the transversal direction of said filter element.

According to an embodiment the offset position is a mutual distance as seen in the transversal direction of the filter element between a centre point in said first outlet and a centre point in said second outlet.

According to an embodiment the filter element has a first end and a second end located opposite to the first end in relation to the filter element, wherein the first outlet is located in the first end and the second outlet is located in the second end. This enables a proper acoustic response and for simplification of the filter element.

According to an embodiment the filter element has a first end panel at the first end and a second end panel at the second end, wherein the first outlet is located in the first end panel. This provides a simple design and for enabling a proper sealing effect between the filter element and a filter housing when installed therein.

According to an embodiment the first end panel being arranged to block any filtered fluid to exit the filter element axially through the first end panel other than through the first outlet. This provides for a certain air flow and for a desired flow and filtration performance.

According to an embodiment the second outlet is located in the second end panel. The acoustic response of the filter element is improved, as well as a minimising of any interference between the respective flows of fluid through the first and second outlets is achieved.

According to an embodiment the second end panel is arranged to block any filtered fluid to exit the filter element axially through the second end panel other than through the second outlet. This enables a correct fluid flow without any leakage, and thereby an improved filtering performance.

According to an embodiment the filter element has a cross-sectional shape with a first extension in a first direction and a second extension in a second direction which is perpendicular to the first direction.

According to an embodiment the first extension is greater than the second extension such that the cross-sectional shape is oval, preferably generally elliptical. This enables locating the second outlet at an offset position in relation to the first outlet at an increased distance compared to for example a circular shape, thereby allowing for a further increased distance between the second outlet and the first outlet in order to improve the acoustic response.

According to an embodiment the offset position of the second outlet in relation to the first outlet is along the first extension direction.

According to an embodiment said filter element has a maximum available offset position which equals to a length corresponding to an extension in said first direction of said inner space subtracted by half of an extension in said first direction of an outer periphery of said second outlet and by half of an extension in said first direction of an outer periphery of said first outlet, wherein said offset position is at least 50%, or preferably at least 75%, or more preferably at least 90% of said maximum available offset position. This way the acoustic response is further improved.

According to an embodiment the first outlet and/or the second outlet has a generally cylindrical cross-section, which enables easy manufacturing and easy connection to adjoining piping.

According to an embodiment the first outlet is located coaxially with the filter element. This enables a compact design of the filter element.

According to an embodiment a cross-sectional shape and dimension of the first outlet is substantially the same as a cross-sectional shape and dimension of the inner space. This limits fluid flow resistance in the filter element.

According to an embodiment a cross-sectional area of the second outlet is substantially smaller than a cross-sectional area of the inner space. This improves the acoustic response of the filter element.

According to an embodiment a cross-sectional area of the second outlet is substantially smaller than a cross-sectional area of the first outlet. This improves the acoustic response of the filter element.

According to an embodiment a cross-sectional shape of the second outlet is substantially the same as a cross-sectional shape of the first outlet, wherein a cross-sectional dimension of the second outlet is substantially smaller than a cross-sectional dimension of the first outlet. A sudden increased cross section of the second outlet compared to the first outlet provides for a significant noise reduction.

According to an embodiment the filter element comprises a filter material body, which preferably is made of a material chosen from the group of: paper and cellulose. These materials are common materials and enables low manufacturing costs.

According to an embodiment the filter element is an air filter element. According to an embodiment the filter element is adapted for cleaning a fluid for an internal combustion engine. According to an embodiment the said first outlet is adapted for conveying clean air to the internal combustion engine.

According to an embodiment the second outlet is adapted for conveying clean air to an auxiliary component. An idea is to use the air filter element to clean the air for the auxiliary component needing clean and air at the same time to configure the air filter element that so it will work as a noise reducing component in the system.

According to an embodiment the filter element is adapted to be removably arranged in a filter housing.

According to an embodiment the second end panel comprises a protruding pipe portion surrounding the second outlet for connection to an adjoining pipe. Having an adjoining pipe connected to the second outlet provides for an easier attachment to an auxiliary component.

According to an embodiment the protruding pipe portion has an extension into the filter element. This functions both as a noise reducing feature as well as a fluid guiding feature.

According to an embodiment the extension of said protruding pipe portion into the filter element has an extension length, the extension length being adapted to arrange for a desired acoustic response in use of the filter element. This enables an adaptation of the length which corresponds to a certain noise reduction.

According to a second aspect of the disclosure a filter housing is disclosed having an inner housing space adapted to receive a tubular filter element, the filter housing having an inlet, a first outlet located in a first end of the filter housing, and a second outlet located in a second end of the filter housing, wherein the second end is located opposite to the first end in relation to the inner housing space. This provides for the filter housing to correspond to the filter element such that a fluid to be filtered is generally evenly spread between the filter housing and the filter element to fully utilize the filtering operation of the filter element. Also, the first outlet of the filter element corresponds to the first outlet of the filter housing, further, the second outlet of the filter element corresponds the second outlet of the filter housing. Thereby a compact filter system is provided.

According to an embodiment the second outlet has an offset position in relation to the first outlet as seen in a transversal direction of the filter housing. A positive effect is to provide an improved acoustic response of the filter housing. According to one example, the transversal direction of the filter housing is perpendicular to an axial direction, or centre axis, of the filter housing.

According to an embodiment the first outlet is located in parallel relationship with said second outlet. According to one example, the first outlet has a first centre axis and the second outlet has a second centre axis, wherein the first outlet is arranged in such a way relative to the second outlet that the first centre axis is in parallel with the second centre axis. According to a further example, the first outlet is arranged in such a way relative to the filter housing that the first centre axis is in parallel with the axial direction, or centre axis, of the filter housing. According to a still further example, which is an alternative or complement to the last mentioned example, the second outlet is arranged in such a way relative to the filter housing that the second centre axis is in parallel with the axial direction, or centre axis, of the filter housing.

According to an embodiment the offset position involves a distance, and preferably is a distance, in the transversal direction of said filter housing.

According to an embodiment the offset position is a mutual distance as seen in the transversal direction of the filter housing between a centre point in said first outlet and a centre point in said second outlet.

According to an embodiment the first end is located in parallel relationship with said second end. Both of these embodiments enable a compact filter housing design.

According to an embodiment the filter housing has a tubular shape which is preferable in order to correspond to the filter element shape.

According to an embodiment the filter housing has a cross-sectional shape which has a first extension in a first direction and a second extension in a second direction, wherein the first extension is greater than the second extension, the second extension preferably being perpendicular to the first extension and that the cross-sectional shape is generally elliptical. This enables easy arrangement of the filter element to the filter housing since the shape of the filter element corresponds to the interior of the filter housing.

According to an embodiment a direction of said offset position between the second outlet and the first outlet coincides with the first extension direction. This enables a maximised offset position between the second outlet and the first outlet, such that a maximised noise reduction may be achieved.

According to an embodiment the first outlet is located coaxially with the filter housing. This enables a compact design of the filter housing.

According to an embodiment the inlet is located in an envelope surface of the filter housing. This enables a compact design of the filter housing.

According to an embodiment the inlet is located in said envelope surface at a position coinciding with said first extension direction. This enables a further increase of the offset position between the inlet of the filter housing and of the second outlet of the filter housing.

According to an embodiment the inlet is located on an opposite side of a middle point of the filter housing in relation to the second outlet. This enables a further increase of the offset position between the inlet of the filter housing and of the second outlet of the filter housing.

According to an embodiment the first outlet has a cross-sectional area and the second outlet has a cross-sectional area, wherein the cross-sectional area of the second outlet is smaller than the cross-sectional area of the first outlet. As mentioned above, a sudden increased cross section of the second outlet compared to the first outlet provides for a significant noise reduction.

According to an embodiment the filter housing comprises a housing lid, the housing lid encompassing the second outlet. This provides for closing and possibly sealing of the filter housing.

According to an embodiment the housing lid comprises a protruding pipe portion at the second outlet for connection to an adjoining pipe. Having an adjoining pipe connected to the second outlet provides for an easy attachment to an auxiliary component.

According to an embodiment the protruding pipe portion has an extension into the filter housing. This functions both as a noise reducing feature as well as a fluid guiding feature.

According to an embodiment the extension of said protruding pipe portion into the filter housing has an extension length, the extension length being adapted to arrange for a desired acoustic response in use of the filter housing.

According to an embodiment an inner housing shape of the filter housing is adapted to match to an outer shape of the filter element. This provides for the filter housing to correspond to the filter element, such that a fluid to be filtered is generally evenly spread between the filter housing and the filter element to fully utilize the filtering operation of the filter element.

According to an embodiment the filter housing is an air filter housing. According to an embodiment the filter housing is adapted to receive a filter element of any of the kind discussed above.

According to a third aspect of the disclosure a filter system is disclosed comprising a filter element and a filter housing of the kind discussed above.

According to a fourth aspect an internal combustion engine is disclosed which comprises a filter system of the kind discussed above.

According to a fifth aspect a vehicle is disclosed which comprises an internal combustion engine of the kind discussed above.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
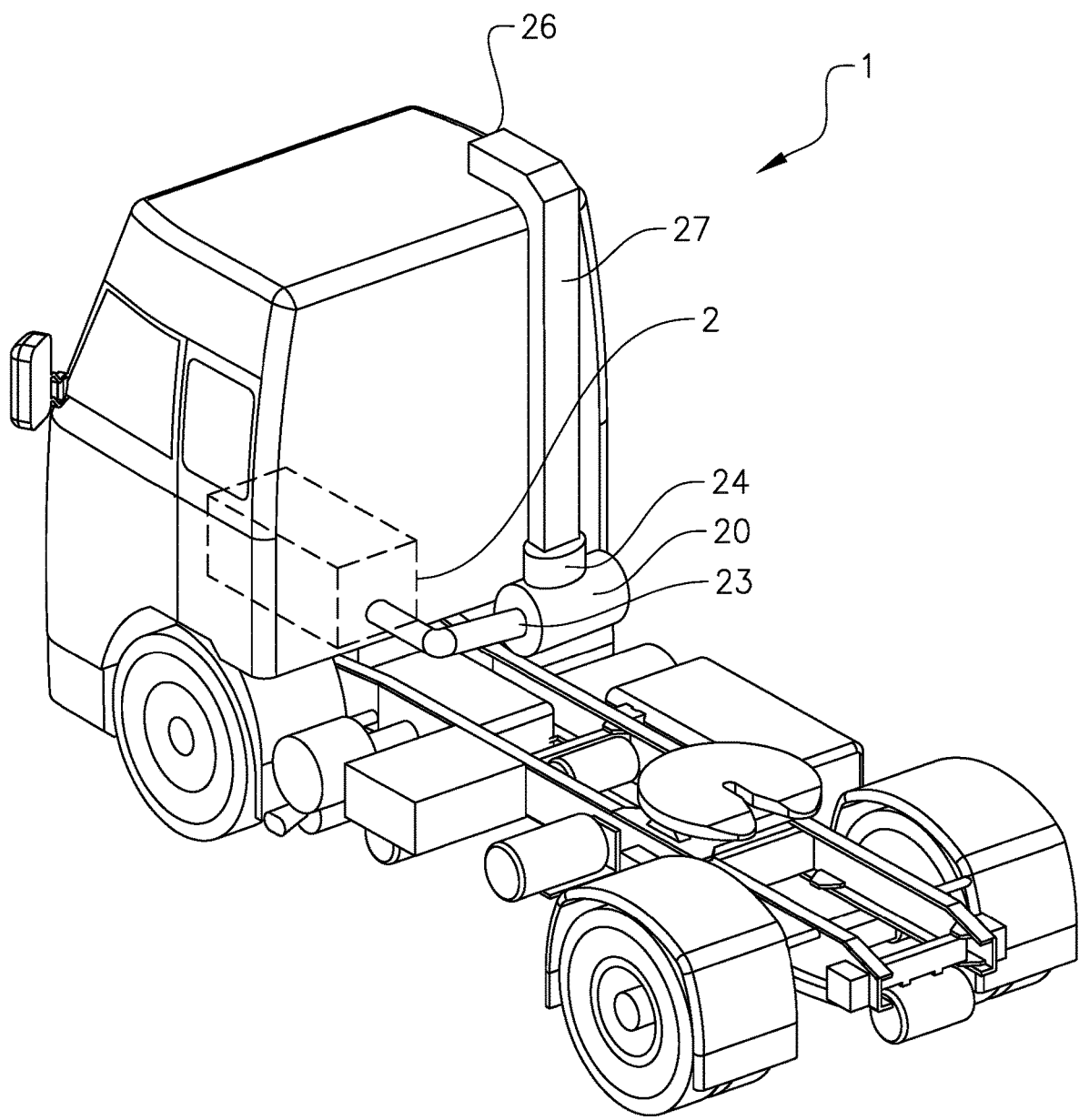
FIG. 1 is a view from behind of a vehicle carrying a filter housing and a filter element according to this disclosure.

With reference to FIG. 1 a heavy duty truck 1 is disclosed for which an internal combustion engine system 2 of a kind disclosed in the present disclosure is advantageous.

However, the internal combustion engine system 2 may well be implemented also in other types of vehicles, such as in busses, in light-weight trucks, passenger cars, marine applications etc. The internal combustion engine system 2 may be e.g. a diesel engine, which as such may be running on several different types of fuel, such as diesel or dimethyl ether, DME. Other fuel types are well suited, as well as hybrid systems. The internal combustion engine system 2 is provided with an air filter element 5, an anchoring device 11 and an air filter housing 20 as disclosed herein.

An air filter element 5 of the kind disclosed herein is located downstream an air intake 27 which draws air from the ambient. The ambient air is most often in need of filtration before being directed towards an inlet of the internal combustion engine system 2. Downstream the air intake 26 an air pipe 27 directs the air to an inlet 24 of the air filter housing 20. Within the air filter housing 20 the air filter element 5 is located through which the air is filtered and further directed through an air outlet 23 and towards the internal combustion engine system 2. The air filter housing 20 is located in a lower region of the vehicle 1 and the air intake 27 in a higher region of the vehicle 1. In the depicted embodiment the air filter housing 20 is located directly behind a vehicle cab, whereas the air intake 26 is located on top of the vehicle cab at a rear end thereof. The air pipe 27 is located at the rear end in a generally vertical position of the vehicle cab. The air filter housing 20 is located having its axial direction transversal to the driving direction of the vehicle 1. The locations of the parts detailed above may well be otherwise.

Figure 2A:
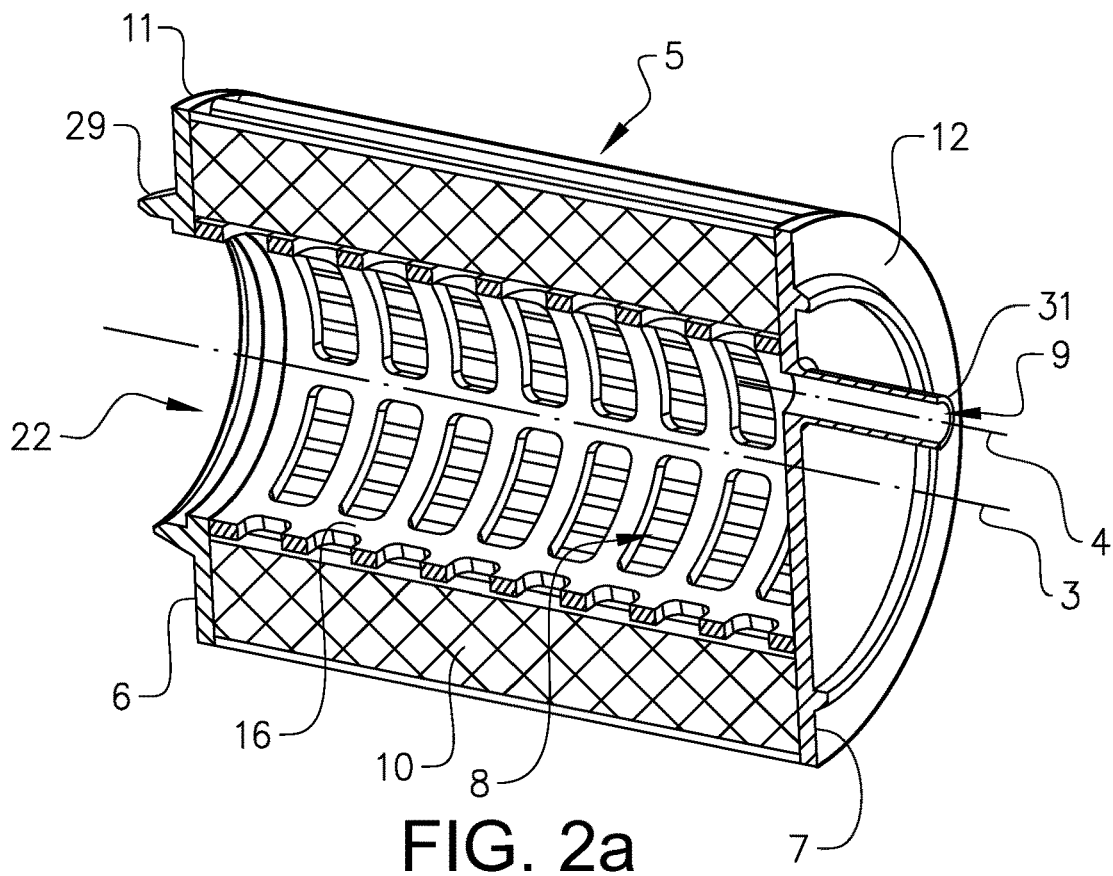
FIG. 2a is a length-wise cross-section of a first embodiment of a filter element of this disclosure.
Figure 2B:
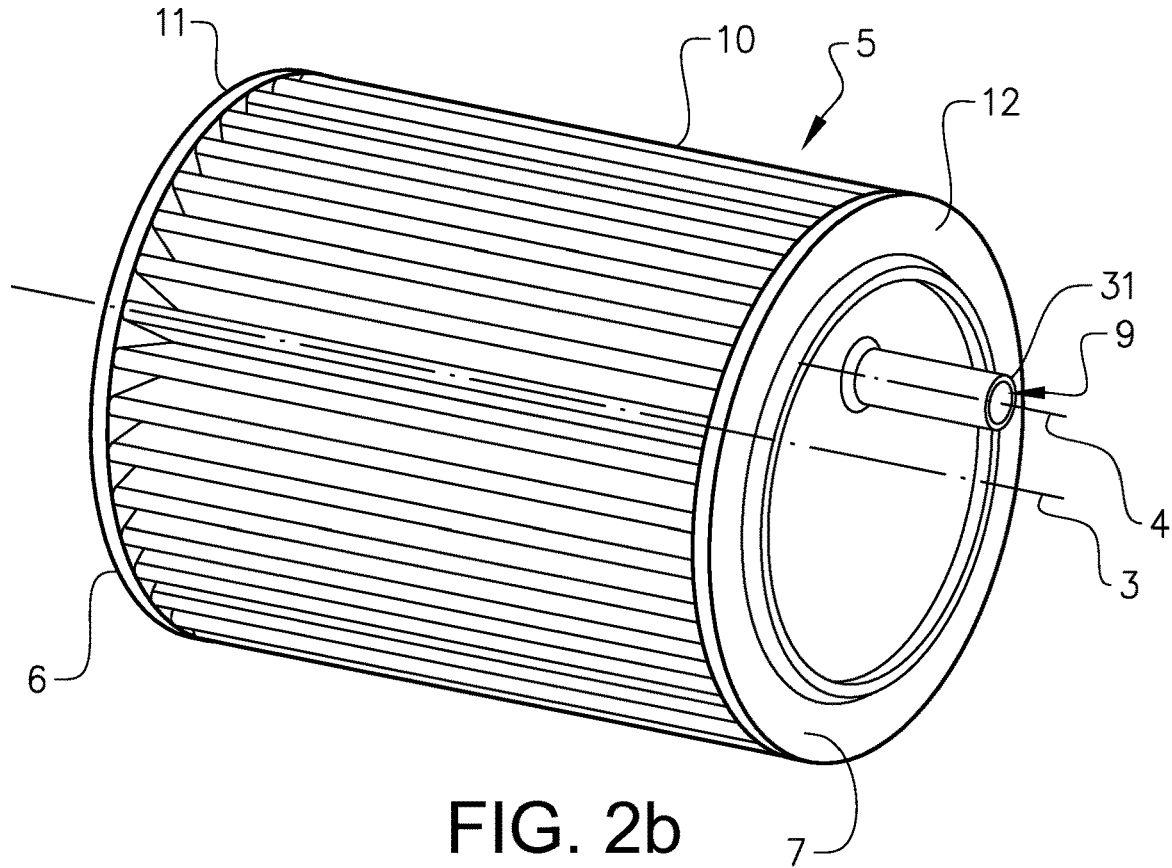
FIG. 2b is a perspective view of the filter element of FIG. 2a, FIG. 2c is a perspective view of the filter element of FIG. 2a, FIG. 3 is a length-wise cross-section of a first embodiment of a filter housing of this disclosure.
Figure 2C:
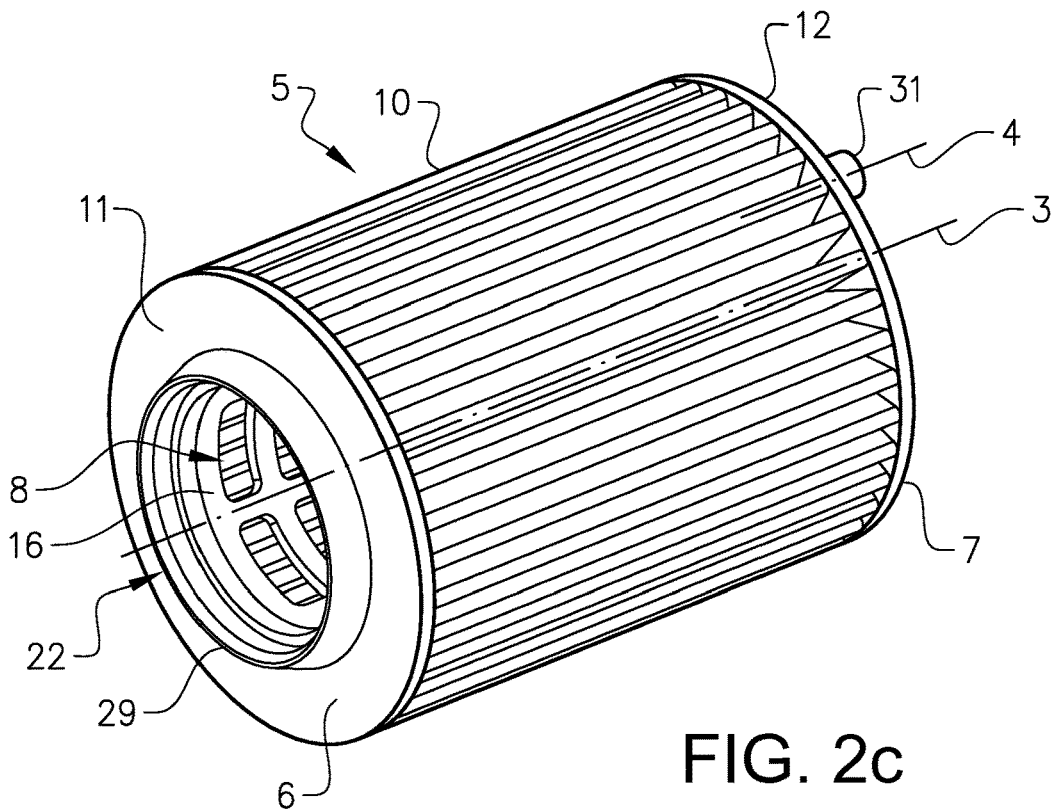

Initially a description of a first embodiment of the present disclosure will be provided based on FIGS. 2a, 2b and 2c. Reference numeral 5 refers to the whole design as shown in FIG. 2a and is named filter element. The filter element 5 is adapted to be removably arranged in a filter housing 20 and comprises a filter material body 10 made of any material that is suited for the filtering operation of the fluid to be filtered. The filter housing 20 will be described in detail in relation to FIG. 3 below. The filter element 5 is an air filter element and is adapted for cleaning air. The filter housing 20 is an air filter housing.

The filter element 5 has an extension in a longitudinal direction along a longitudinal centre axis, and an extension in a transversal direction in a transversal plane which is perpendicular to the longitudinal direction and the longitudinal centre axis. The filter element 5 has a circular cylindrical tubular shape defining an inner space 8, wherein a first outlet 22 and a second outlet 9 is in communication with the inner space 8, as shown in FIG. 2a. The second outlet 9 has an offset position in relation to the first outlet 22 in the transversal direction of the filter element 5. As can be gleaned from FIG. 2, the offset position involves a distance, and preferably is a distance, in the transversal direction of the filter element 5. The offset position is measured as a mutual distance as seen in the transversal direction of the filter element 5 between a centre point in the first outlet 22 and a centre point in the second outlet 9. The first outlet 22 is located coaxially with the filter element 5, or in other words such that its centre point lies on the longitudinal centre axis of the filter element 5. The offset position of the second outlet 9 in relation to the first outlet 22 is consequently in this embodiment measured as a distance in the transversal direction of the filter element 5 between the longitudinal centre axis of the filter element 5 and the centre point of the second outlet 9. The first outlet 22 is adapted for conveying clean air to the internal combustion engine system 2, and the second outlet 9 is adapted for conveying clean air to an auxiliary component which may be located within the internal combustion engine system 2, or may be of other kind and position in the vehicle 1. In this embodiment, the first outlet 22 and the second outlet 9, respectively, have an axial extension. Consequently, the first outlet 22 has a first centre axis 3 coinciding with the centre point of the first outlet 22, and the second outlet 9 has a second centre axis 4 coinciding with the centre point of the second outlet 9, depicted in FIG. 2a, wherein the offset position of the second outlet 9 in relation to the first outlet 22 is measured as an offset position between the second centre axis 4 in relation to the first centre axis 3 in the transversal direction of the filter element 5. The first centre axis 3 is coinciding with the longitudinal centre axis of the filter element 5.

The filter element 5 has a first end 6 and a second end 7. The second end 7 is located opposite to the first end 6 in relation to the filter element 5 along the longitudinal centre axis. The filter element 5 further has a first end panel 11 at the first end 6 and a second end panel 12 at the second end 7, wherein the first outlet 22 is located in the first end panel 11 and the second outlet 9 is located in the second end panel 12, as depicted in FIG. 2a. The first end panel 6 is arranged to block any filtered fluid to exit the filter element 5 axially through the first end panel 11 other than through the first outlet 22. The first end panel 6 is hence located at the first end 6 such that it covers both the filter material body 10 and any parts of the inner space 8 surrounding the first outlet 22 at this end. The second end panel 12 is arranged to block any filtered fluid to exit the filter element 5 axially through the second end panel 12 other than through the second outlet 9. The second end panel 12 is hence located at the second end 7 such that it covers both the filter material body 10 and any parts of the inner space 8 surrounding the second outlet 9 at this end. The first end panel 6 and the second end panel 12 may be made of a single panel as in the depicted embodiment, or of a combination of materials and/or sub-panels. Both the first end panel 6 and the second end panel 12 are made planar and parallel to the transversal direction of the filter element 5. Further, both the first outlet 22 and the second outlet 9 have a cylindrical cross-section. The first outlet 22 is located coaxially with the filter element 5.

FIG. 2b discloses that the cross-sectional area and the diameter of the second outlet 9 are substantially smaller than the cross-sectional area and the diameter of the inner space 8. It should be noted that the cross-sectional area and the diameter of the second outlet 9 is substantially smaller than the cross-sectional area and the diameter of the first outlet 22.

Disclosed in FIG. 2c is the cross-sectional shape and diameter of the first outlet 22 which is substantially the same as the cross-sectional shape and diameter of the inner space 8.

Furthermore, the filter element 5 comprises a filter material body 10 surrounding the inner space 8. When the filter element 5 is used in connection with an internal combustion engine system 2, i.e. when the filtering operation is performed on air such as ambient air, the filter material body 10 is made of a material such as paper or cellulose. The paper filter material body 10 of the depicted embodiments has a corrugated or pleated surface, but may also be made otherwise and of other suitable materials, or material combinations, As illustrated in i.a. FIG. 2a the filter element 5 of this embodiment comprises an inner portion 16 for maintaining the shape of the filter element 5 in use of the filter element 5 when air is filtered through the filter material body 10. When the filter material body 10 is made of a relatively seen flexible material and design, it could otherwise collapse due to the air pressure during use. The inner portion 16 is tubular and air permeable, and is made of a plastic material. The inner portion 16 is in the present embodiment made as a rectangular net, but could also have any other shape which may maintain the shape of the filter element 5, while not interfering the air flow through the filter element 5. The material may also be of other kind. The thickness of the inner portion 16 is small in relation to the thickness of the filter material body 10.

A sealing portion 29 is arranged to the filter element 5 for sealing engagement around the first outlet 22. The sealing portion 29 is made of a flexible rubber material which may adapt in use to a surface of the filter housing or of a pipe portion to which it abuts.

It may be gleaned from FIGS. 2a and 2b that the second end panel 12 comprises a protruding pipe portion 31 which adjoins and surrounds the second outlet 9. The protruding pipe portion 31 is made in one piece with the second end panel 12. The protruding pipe portion 31 is designed for connection to an adjoining pipe for further distribution of filtered secondary air to an auxiliary component.

The reason for positioning the second outlet 9 in the depicted position is to improve the acoustic response of the filter element 5. The filter element 5 may consequently be used as a noise reduction means. The larger the offset between the first center axis 3 and the second axis 4 the better from a noise reduction point of view. The best noise reduction properties will be achieved when a maximum distance is used for the offset. In the depicted embodiment the second outlet 9 is hence positioned as close as possible to the inner side of the filter material body 10, which position is related to the diameter of the second outlet 9. This position is achieved when the outer periphery of the second outlet 9 is located adjacent to the periphery of the inner space 8 and consequently of the filter material body 10. In other words, the centre point of the second outlet 8 and thus the second centre axis 4 is located at a distance corresponding to half the diameter, i.e. to the radius, of the second outlet 9 from the periphery of the inner space 8.

Correspondingly, the outer periphery of the first outlet 22 is located adjacent to the periphery of the inner space 8 in a position across the filter element 5 as seen in relation to the position of the second outlet 9. Since the diameter of the first outlet 22 is substantially the same as the diameter of the inner space 8, the first outlet 22 cannot be positioned otherwise in this embodiment and hence a maximum offset position is achieved. If however the diameter of the first outlet 22 would be less than the diameter of the inner space 8, then it would be possible to further increase the offset position between the first outlet 22 and the second outlet 9. The maximum available offset position is set by the geometrical constraints of the filter element 5, such that the maximum available offset position equals a distance or length corresponding to the diameter of the inner space 8 subtracted by the radius of the outer periphery of the second outlet 9 and by the radius of the outer periphery of the first outlet 22. The offset position should be at least 50%, or preferably at least 75%, or more preferably at least 90% of the maximum available offset position.

Figure 3:
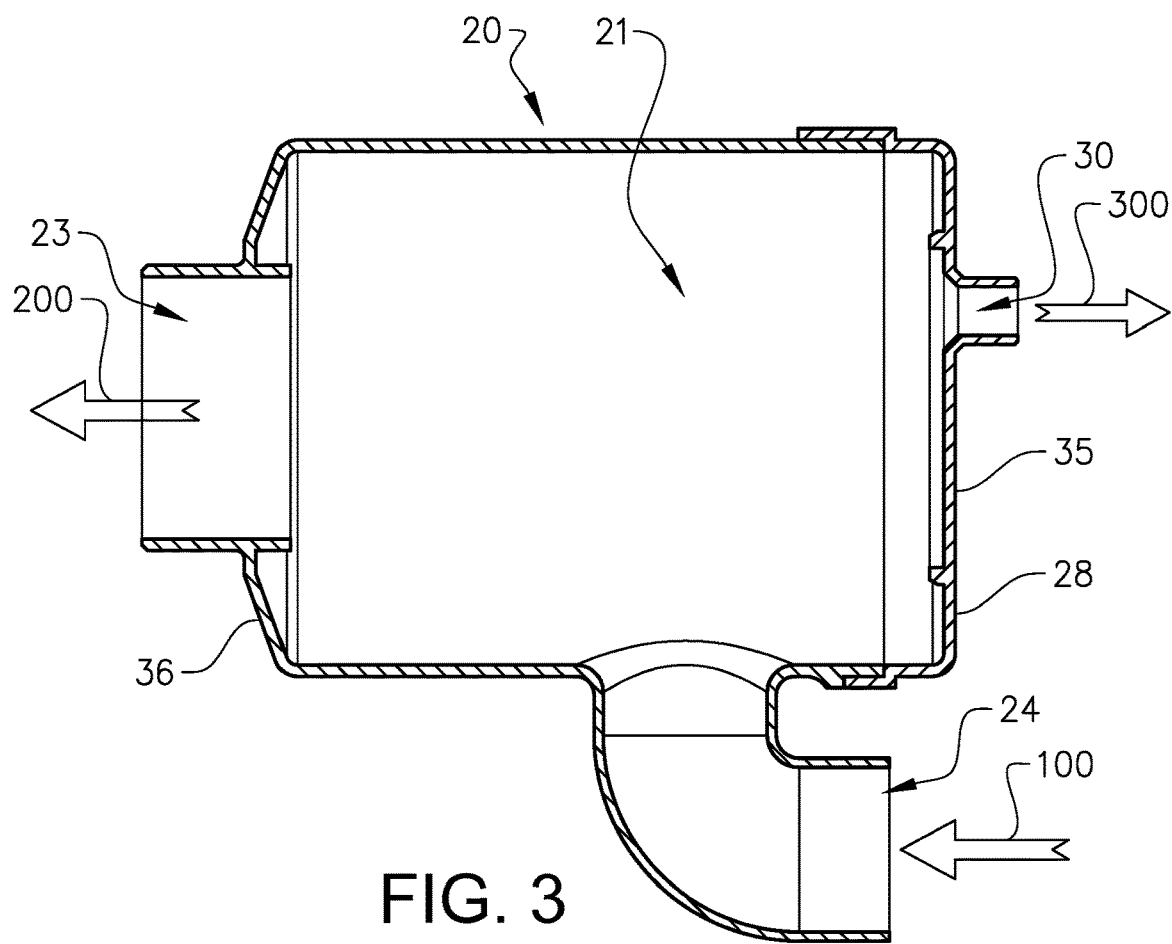

Turning now to FIG. 3, a flow of air to be filtered through the filter element 5 is disclosed in relation to the filter housing 20. The filter housing 20 has an extension in a longitudinal direction along a longitudinal centre axis, and an extension in a transversal direction in a transversal plane which is perpendicular to the longitudinal direction and the longitudinal centre axis. The filter housing 20 comprises a fluid inlet 24, a first fluid outlet 23 and a second fluid outlet 30. The fluid inlet 24 is located in the curved outer periphery, or in other words, in the envelope surface of the filter housing 20. The curved envelope surface is circular cylindrical. The fluid inlet 24 is furthermore slightly inclined in relation to a normal to the outer periphery. The filter housing 20 has a housing lid 35 for opening the filter housing 20 to lay a inner housing space 21 bare which is adapted to receive the filter element 5. The housing lid 35 is also adapted to seal the opening in the filter housing 20 when the housing lid 35 is closed. The filter housing 20 further has a first end 36 and a second end 28, at opposite ends of the inner housing space 21 along the longitudinal centre axis. The housing lid 35 is part of, or even encompasses, the second end 28 of the filter housing 20. Both the first end 36 and the second end 28 of the filter housing 20 are generally parallel to a transversal direction of the filter housing 20. The housing lid 35 is closed using otherwise known clips.

The first fluid outlet 23 is located in the first end 36 and the second fluid outlet 30 is located in the housing lid 35. In correspondence with the design of the filter element 5, the first fluid outlet 23 is located coaxially with the envelope surface of the filter housing 20. The first fluid outlet 23 has a first centre axis and the second fluid outlet 30 has a second centre axis. Also in correspondence with the design of the filter element 5, the offset position of the second fluid outlet 30 in relation to the first fluid outlet 23 is defined by an offset position between the second centre axis in relation to the first centre axis in the transversal direction of the filter housing 20. The offset position involves a distance, and preferably is a distance, in the transversal direction of the filter housing 20. The offset position is measured as a mutual distance as seen in the transversal direction of the filter housing 20 between a centre point in said first outlet 23 to a centre point in said second outlet 30. The second fluid outlet 30 is furthermore located in a position the most far away from the fluid inlet 24 in the filter housing 20 in order to improve the acoustic response of the filter housing 20. In order for the filter element 5 to be installable in the filter housing 20, the first fluid outlet 23 is positioned within the filter housing 20 in a position corresponding to the position of the first outlet 22 in the filter element 5, and the second fluid outlet 30 is positioned within the filter housing 20 in a position corresponding to the position of the second outlet 9 in the filter element 5.

The housing lid 35 has at the second fluid outlet 30 a pipe portion 30 which is made in one piece with the housing lid 35. The pipe portion 30 has an inner diameter which is adapted to tightly enclose the protruding pipe portion 31 of the filter element 5 when the filter element 5 is installed in the filter housing 20. The pipe portion 30 is shorter than the protruding pipe portion 31, such that the protruding pipe portion 31 in use protrudes past the pipe portion 30 for connection to an adjoining pipe. The pipe portion 30 is thus adapted to also seal off the inner housing space 21 from the ambient.

When in use, the air to be filtered, represented by arrow 100, hence enters the filter housing 20 through the fluid inlet 24, spreads around the outside of the filter element 5 within the filter housing 20 and the inner housing space 21, penetrates through the filter element 5 and the filter material body 10, such that the air is filtered, and finally the filtered, and preferably generally cleaned air, leaves the filter housing 20 through the first fluid outlet 23 and the second fluid outlet 30. The air which leaves the filter housing 20 through the first fluid outlet 23 is represented by arrow 200, and the air which leaves through the second fluid outlet 30 is represented by arrow 300. The air pipe 27 which connects to the fluid inlet 24 is inclined such that the fluid has a flow component directed slightly towards the first fluid outlet 23.

It should be noted that the filter housing 20 may have many other designs and still maintain the filtering, noise reduction and housing function in relation to the filter element 5.

Figure 4:
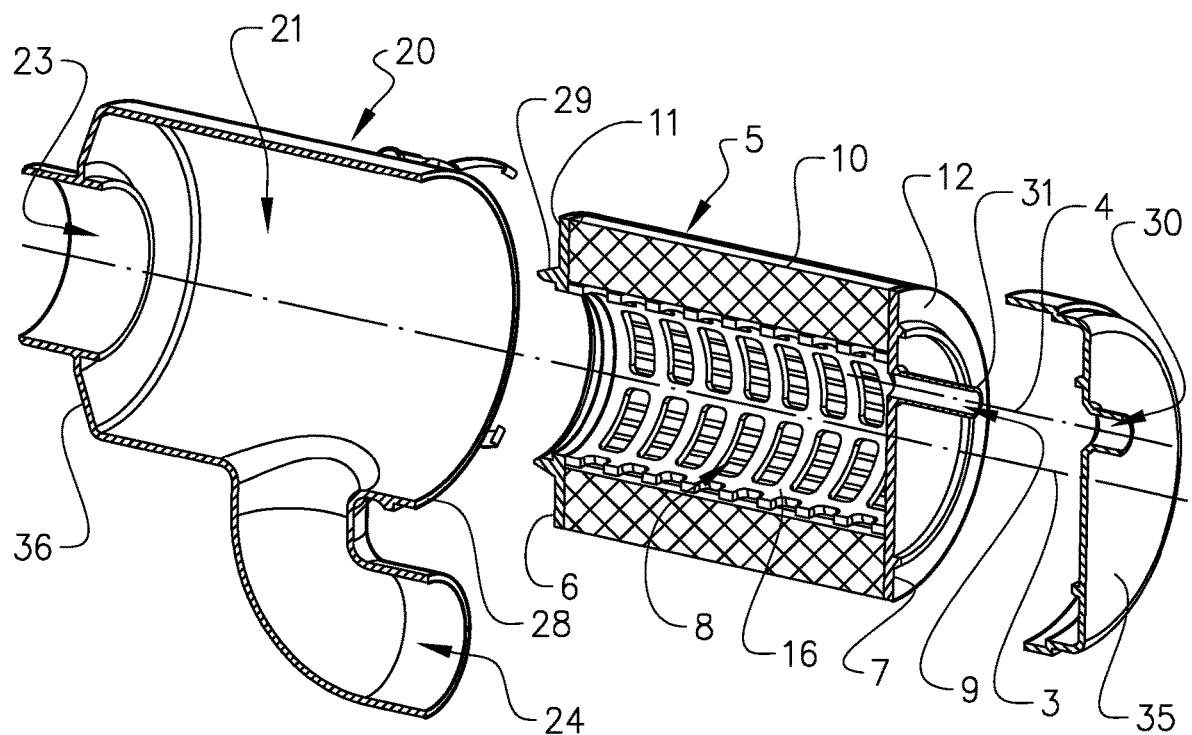
FIG. 4 is an exploded length-wise cross-section of the first embodiment of the filter element installed in the filter housing.

The filter housing 20 has generally the same curved shape as the filter element 5 in order to distribute the air well around the filter element 5. An outer surface of the filter element 5 is adapted to be closely aligned with a curved inner surface of the filter housing 20, as depicted in FIG. 4, in which the filter element 5 is disclosed in a position installed in the filter housing 20. The filter housing 20 has a curved inner surface which is slightly larger than the outer curved shape of the filter element 5, such that the air to be filtered may spread well around the filter element 5 in order to utilise the full outer surface are of the filter element 5.

In FIG. 4 is may be gleaned that the protruding pipe portion 31 of the filter element 5 protrudes through the pipe portion 30 of the filter housing 20. It may also be gleaned that the sealing portion 29 at the first outlet 22 of the filter element 5 is adapted in size and position to the first fluid outlet 23 of the filter housing 20 in order to seal off the inner housing space 21 from the ambient and the inner space 8 from the inner housing space 21.

Figure 5:
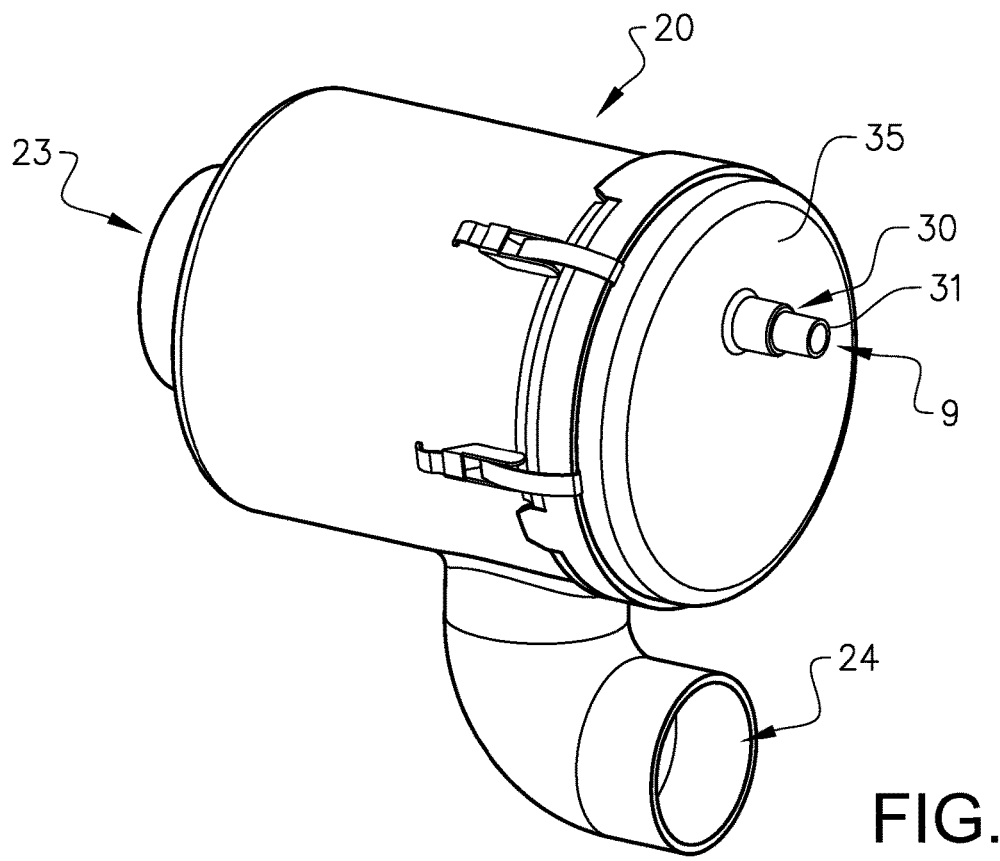
FIG. 5 is a perspective view of the first embodiment of the filter element installed in the filter housing.

As depicted in FIG. 5 the filter element 5 is disclosed installed in the filter housing 20 with the housing lid 35 closed. Generally only the protruding pipe portion 31 may be seen of the filter element 5.

Figure 6:
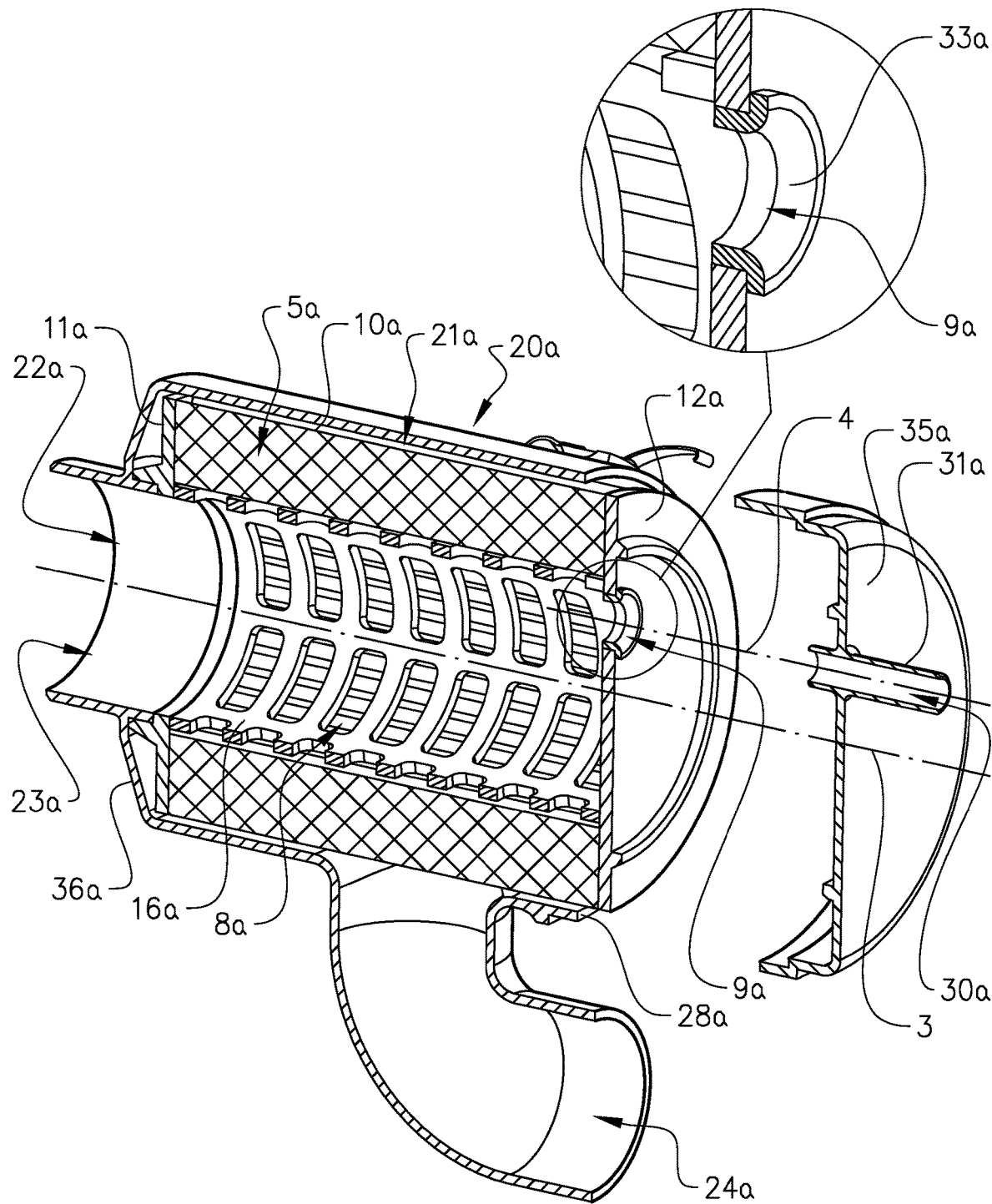
FIG. 6, is a exploded, perspective length-wise cross-section of a second embodiment of a filter element installed in a second embodiment of a filter housing of this disclosure.

According to a second embodiment depicted in FIG. 6 the filter housing 20a comprises a housing lid 35a, wherein the housing lid 35a encompasses the second outlet 9a. In this embodiment the lid 35a of the filter housing 20a has a pipe portion 30a which enters through the second outlet 9a of the filter element 5a into the inner space 8a of the filter element 5a. It also protrudes in an opposite direction, out of the filter housing 20a for connection to an adjoining pipe for further distribution of filtered secondary air to an auxiliary component. The pipe portion 30a according to this embodiment hence protrudes in both directions of the housing lid 35a. The second outlet 9a of the filter element 5a represents a hole, without any protruding pipe portion as was the case for the first embodiment. The second outlet 9 however has a sealing 33a which encompasses the hole and which surrounds the pipe portion 30a when installed in the filter housing 20a. The sealing 33a is used in order to seal between the inner space 8a, the inner housing space 21 and the ambient.

Figure 7:
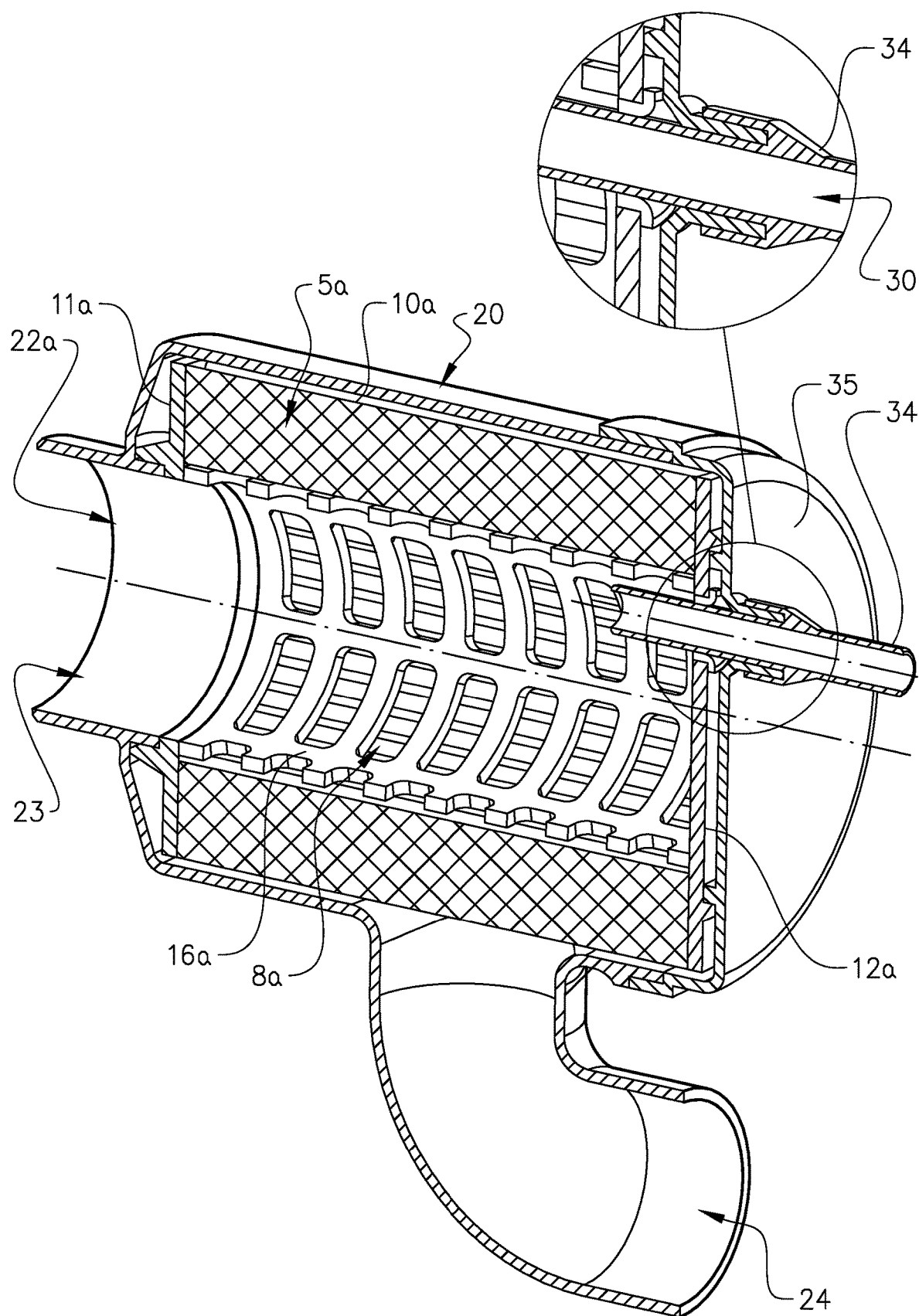
FIG. 7 is a perspective length-wise cross-section of the second embodiment of the filter element installed in the first embodiment of the filter housing of this disclosure.

According to a third embodiment depicted in FIG. 7, a filter system is disclosed which is a combination of the second embodiment of the filter element 5a and the first embodiment of the filter housing 20. The housing lid 35 comprises a pipe portion 30 at the second outlet 30 for connection to an adjoining pipe 34. The adjoining pipe 34 is only shown in the part which closely encloses the pipe portion 30, and the adjoining pipe 34 may either continue towards the auxiliary component, or may be used to, in turn, be connected to another pipe which continues towards the auxiliary component. The adjoining pipe 34 is in this embodiment extending into the filter housing 20a, and has an extension length which is adapted to arrange for a desired acoustic response in use of the filter housing 20 and the filter element 5a. The extension length should consequently be adapted to size, shape and other configuration of the filter system.

Figure 8:
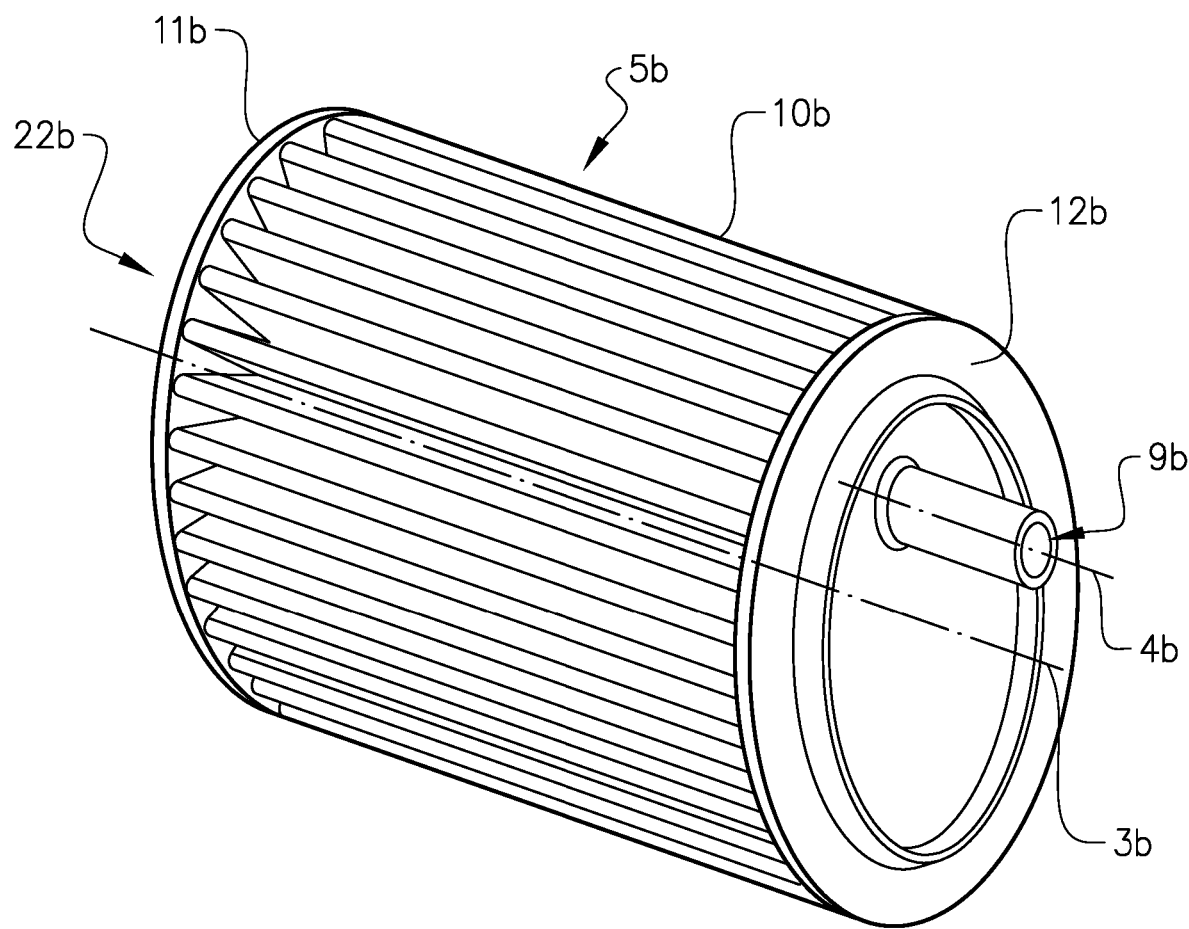
FIG. 8 is a schematical perspective view of a third embodiment of a filter element of this disclosure.

The filter element 5, 5a which has been disclosed as having a circular cylindrical cross-sectional shape may also be given a shape which is oval or elliptical. Such an embodiment is schematically disclosed in FIG. 8. In such a case the filter element 5b has a first extension in a first direction and a second extension in a second direction which is perpendicular to the first direction. In order for the filter element to become elliptical or oval the first extension is greater than the second extension. In the depicted embodiment also the first outlet 22b and the second outlet 9b are also oval or elliptical. The offset position of the second outlet 9b in relation to the first outlet 22b is in such a case along the first extension direction. This way the second outlet 9b may be positioned at a maximum distance from the inlet into the filter housing, in order to improve the acoustic response of the filter system. In such a filter system the filter housing is equally either oval or elliptically shaped. It should be noted that neither the first outlet 22b nor the second outlet 9b must be oval or elliptical when the filter element 5b is, but could for ease of connection to other components of the internal combustion engine system or other application be circular cylindrical. The maximum available offset position equals in this embodiment a distance or length corresponding to the extension in the first direction of the inner space 8 subtracted by half of the extension in the first direction of the outer periphery of the second outlet 9 and by half of the extension in the first direction of the outer periphery of the first outlet 22. The offset position should be at least 50%, or preferably at least 75%, or more preferably at least 90% of the maximum available offset position.

In the above disclosed embodiments the direction of fluid flow may be opposite to the one depicted, the size of the filter housing 20, 20a in relation to the filter element 5, 5a, 5b may be different, the material of the filter material body 10, 10a, 10b may be other such as e.g. made of a foam material, the thickness of the filter element 5, 5a, 5b may be otherwise chosen, the size and position of the first outlet 22, 22a, 22b and the second outlet 9, 9a, 9b may be otherwise chosen, etc. without deviating from the scope of this disclosure. Correspondingly for the filter housing. It is noted that both the filter element and the filter housing at the respective second outlet 9 and 30 may be a simple hole or orifice, possibly provided with a sealing ring, and an adjoining pipe which is used for further distribution of filtered secondary air to an auxiliary component may be positioned within and through both of the second outlets 9, 30 for communication with the inner space of the filter element. When the second outlet of the filter housing is a simple hole or orifice it may also be made wider than the hole or orifice of the second outlet of the filter element. In such a case the housing lid should seal against the second end panel of the filter element in order to seal off the inner housing space of the filter housing from the ambient. Another alternative is to utilise an abutment which is present in the disclosed embodiments on the second end panel towards an inner surface of the filter housing as sealing off of the inner housing space of the filter housing from the inner space of the filter element. In such a case the second end panel may not need to cover the full second end of the filter element, but may be used as holder for the filter material body. In such a case there is generally no need for a specific second outlet at the second end of the filter element, but instead the second end panel lays the inner space bare such that secondary air may leave the filter housing directly through the second outlet. When the second outlet of the filter element and/or of the filter housing have an longitudinal extension, such as in the first embodiment disclosed above, the offset position may not only involve a mutual distance to the respective first outlet, but may additionally involve an angular deviation between the respective first and second outlets. These alternatives may be used singularly or in combination with any one of the above disclosed embodiments of either the filter element or the filter housing.

The alternative embodiments which have been disclosed above may be combined in any way which is found advantageous, unless anything else is explicitly stated, as long as the features of the main claims are fulfilled.

It is to be understood that the present invention is not limited to the embodiments described above and illustrated in the drawings; rather, the skilled person will recognize that many changes and modifications may be made within the scope of the appended claims.

The invention claimed is:

1. An air filter element having a tubular shape defining an inner space, the filter element having a first end panel at a first end and a second end panel at a second end located opposite to the first end in relation to a longitudinal direction of the filter element, a first air outlet located in the first end panel and in communication with the inner space and a second air outlet located in the second end panel and in communication with the inner space, wherein the first air outlet has a first centre axis and the second air outlet has a second centre axis, wherein the first centre axis and the second centre axis are parallel to one another, wherein the first centre axis and the second centre axis are arranged at an offset position in relation to one another in a direction perpendicular to the extension of the first and second centre axis, wherein a cross-sectional area of the second air outlet is smaller than a cross-sectional area of the first air outlet, wherein the second air outlet extends axially through the second end panel from the inner space and out from the filter element and, wherein a cross-sectional shape and dimension of the first air outlet is the same as a cross-sectional shape and dimension of the inner space.

2. The air filter element according to claim 1, wherein the offset position involves a distance-in the transversal direction of the filter element.

3. The air filter element according to claim 1, wherein the offset position is a distance as seen in the transversal direction of the filter element between a centre point in the first air outlet and a centre point in the second air outlet.

4. The air filter element according to claim 1, wherein the filter element has a cross-sectional shape with a first extension in a first direction and a second extension in a second direction which is perpendicular to the first direction.

5. The air filter element according to claim 4, wherein the first extension is greater than the second extension such that the cross-sectional shape is oval.

6. The air filter element according to claim 5, wherein the offset position of the second air outlet in relation to the first air outlet is along the first extension direction.

7. The air filter element according to claim 1, wherein the filter element has a maximum available offset position which equals to a length corresponding to an extension in a first direction of the inner space subtracted by half of an extension in a first direction of an outer periphery of the second air outlet and by half of an extension in a first direction of an outer periphery of the first air outlet, wherein the offset position is at least 50% of the maximum available offset position.

8. The air filter element according to claim 1, wherein the first air outlet and/or the second air outlet has a cylindrical cross-section.

9. The air filter element according to claim 1, wherein the first air outlet is located coaxially with the filter element.

10. The air filter element according to claim 1, wherein a cross-sectional area of the second air outlet is smaller than a cross-sectional area of the inner space.

11. An internal combustion engine comprising an air filter element according to claim 1.

12. A vehicle comprising an internal combustion engine according to claim 11.

* * * * *